Patented Apr. 19, 1938

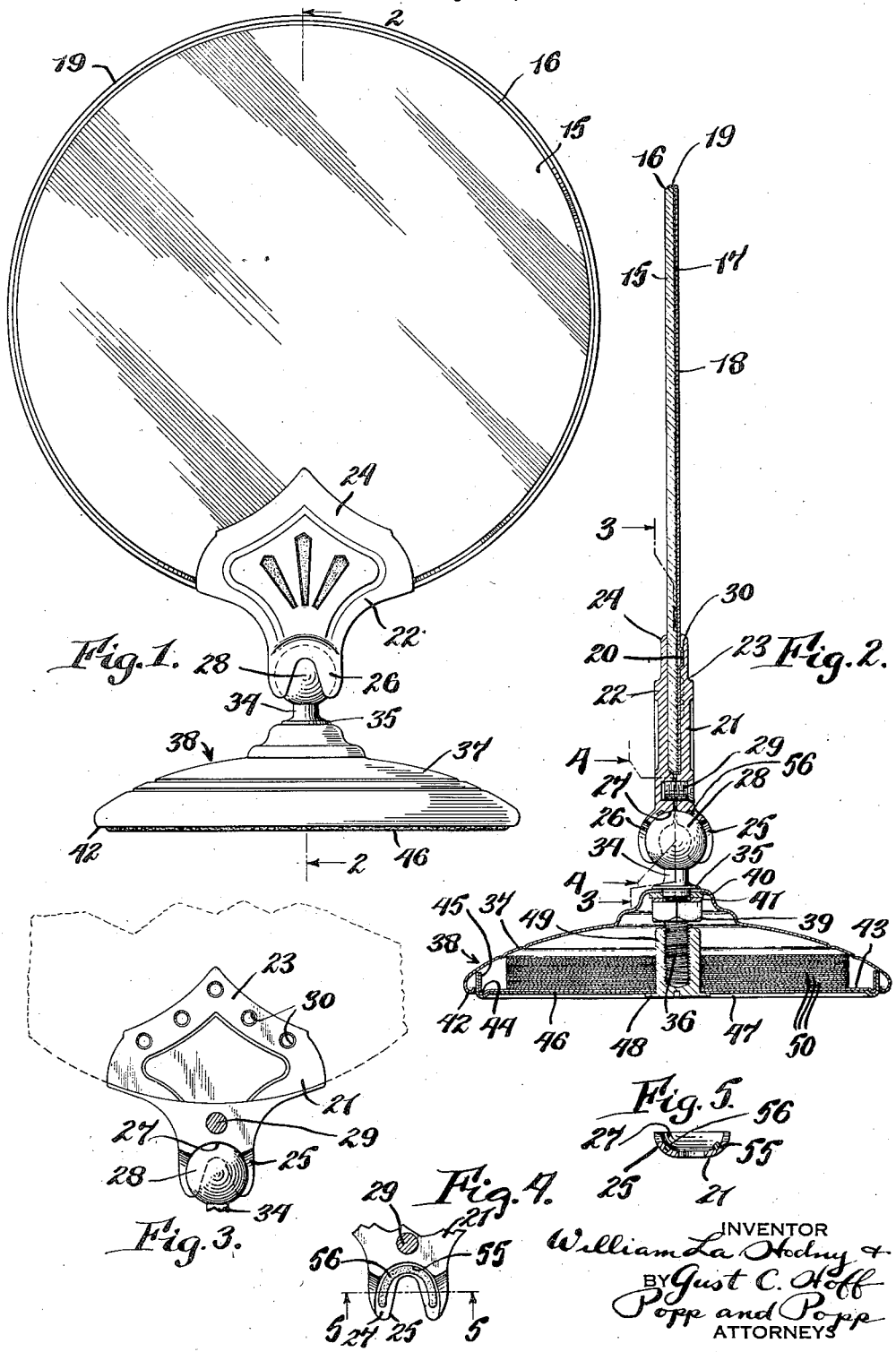

2,114,767

UNITED STATES PATENT OFFICE 2,114,767

MIRROR

William La Hodny and Gust C. Hoff, Buffalo, N. Y., assignors to Standard Mirror Company, Inc., Buffalo, N. Y., a corporation of New York Application September 1, 1934, Serial No. 742,435

6 Claims. (Cl. 88—97)

This invention relates to a mirror and more particularly to a shaving mirror, although, of course, the mirror could also be used for other purposes.

This is a continuation in part of our co-pending application, now Patent No. 2,058,603, dated October 27, 1936.

An object of the present invention is to provide such a mirror which is extremely simple and inexpensive in construction so that mirrors made in accordance with the invention can be sold at very low cost and in which the mirror is securely held by the clamping members constituting the universal joint.

Another object of the present invention is to provide such a mirror which is very attractive in appearance and in which substantially the full face of the mirror is usable, the construction permitting the use of a substantially rimless mirror.

In the accompanying drawing:

Fig. 1 is a front elevation of a shaving mirror embodying our invention.

Fig. 2 is a vertical section, taken on line 2—2, Fig. 1.

Fig. 3 is a vertical section, taken on line 3—3, Fig. 2 and showing one of the clamping members.

Fig. 4 is a fragmentary vertical section, taken on line 4—4, Fig. 2.

Fig. 5 is a fragmentary horizontal section, taken on line 5—5, Fig. 4.

The mirror proper is shown as comprising a circular piece of plate glass 15 having a bevelled edge 16 and having its back silvered, as indicated at 17, although it will be understood that various other reflective coatings can be applied instead of silver. This mirror plate is provided with a metal back 18 which conforms to the shape of the mirror and has its edge 19 turned around the edge of the mirror and engaging the bevel 16 so that the metal back completely encloses the rear side of the mirror and embraces the bevel all around its periphery. The metal backing may be of any form and finish, but a pleasing finish is achieved by making the back of chromium plated metal and suitably dulling a part of the plated surface so as to provide any desired design. Before the metal backing 18 is applied to the mirror a series of teats or buttons 20 are pressed outwardly from the metal backing plate along its lower edge, these buttons being subsequently employed to anchor the clamping jaws, as hereinafter described. It will be understood, of course, that the backing plate 18 could be made of other materials than metal, such as sheet pyroxylin plastic.

The clamping jaws 21 and 22 are preferably die cast and can be of any suitable configuration and the end 23 of the section 21 and the end 24 of the section 22 are preferably quite broad and pointed, as best illustrated in Figs. 1 and 3, so as to provide a reliable grip on the opposite flat faces of the mirror proper both vertically and horizontally. By making the gripping portions 23 and 24 generally spade-shaped in this manner it is apparent that the field of the mirror is interfered with to the least extent.

The opposite end of the clamping jaw 21 is bifurcated to provide a claw 25 and the corresponding end of the clamping jaw 22 is bifurcated to provide a similar jaw 26. The two claws 25 and 26 jointly provide a spherical recess 27 which engages a ball 28. The clamping sections 21 and 22 are drawn tightly together by a screw 29, this screw tightly clamping the mirror proper between the spade-shaped ends of the clamping sections and also frictionally clamping the ball 28 between the claws 25 and 26 so that while a universal joint is provided sufficient friction is provided to hold the mirror in any position to which it may be moved.

Where both the ball 28 and the claws 25 and 26 are plated it has been found difficult to obtain the necessary friction for supporting the mirror in any adjusted position, inasmuch as plated metal is, of course, very smooth, especially chromium plating which has no grain structure and is extremely slippery. In accordance with the present invention, therefore, the inside of each of the claws 25 and 26 is provided with a horseshoe-shaped groove 55 in which is placed a horseshoe-shaped facing 56 of yielding material, such as cork, which provides the necessary friction between the ball and the two claws. It is obvious, of course, that this facing is not necessarily horseshoe-shaped but can be of any suitable form.

It has been found that the highly polished faces of the plate glass and metal backing prevent a reliable grip between the two clamping sections and the mirror by frictional engagement alone and that a positive lock is necessary in order to prevent the mirror proper from being pulled free from the jaws. Thus, regardless of how much the screw 29 is tightened and regardless of what type of friction facing may be interposed between the two clamping sections and the mirror, the mirror will not be reliably held. To provide a positive interlock between the mirror proper and the clamping jaws the buttons 20 of the metal backing plate 18 are provided and these buttons fit, preferably snugly, into corresponding recesses 30 in the clamping section 21. In the form of the invention shown, five of such buttons and recesses are provided and these have been found to firmly grip the mirror and hold it against displacement since it would be necessary to shear the buttons off before the mirror could be moved by a pull in a plane parallel with its face.

It is obvious that other forms of interlocking means could be employed and a number of such means are shown in our patent above mentioned.

The ball 28 is mounted on an integral stem 34 having an enlarged collar 35, the lower end of the stem 34 being threaded, as indicated at 36. The threaded end 36 of the stem 34 extends through the upper part or cap 37 of the base which is indicated generally at 38, this cap being preferably made of the same type of sheet metal as the back 18 of the mirror and preferably being round. In order to secure the stem securely to the cap 37 of the base the stem projects through a central opening in the upper part of the base and is held in position by a nut 39, a suitable washer 40 and lock washer 41 being suitably inserted between the nut 39 and the inside of the upper section 37 of the base.

The underside of the upper part or cap 37 of the base is open and its rim is preferably beaded, as indicated at 42. The underside of the base is closed by a circular plate 43 having a downwardly projecting marginal bead 44 and an upright marginal flange 45 which fits into the upper part 37 of the base and close to its bead 42. This bottom plate 43 is preferably covered with a piece of felt 46 or like material so that there is no danger of scratching a highly polished surface on which the shaving mirror may be placed. It will be noted that the bead 44 of the base plate 43 extends below the bead 42 of the upper section 37 of the base and inasmuch as the bead 44 is covered with felt it will be seen that the mirror can be tipped a substantial extent without danger of the metal bead 42 injuring the surface on which the mirror is supported. It will be further observed that the bead 44 provides a space 47 between the center of the base plate and the surface on which the mirror may be supported. In this space is arranged the head 48 of a locking sleeve 49, this sleeve being internally threaded and screwing on the threaded end 36 of the stem 34 so as to draw the base plate 43 and upper section 37 of the base toward one another. The head of the sleeve 49 is in the form of a thin annular flange which encases the underside of the plate 43 around a central opening provided therein for the jaw of the sleeve 49.

In order to permit of using a small base 38 this base is weighted. For this purpose a number of disks 50 of sheet metal having openings in their centers are arranged between the upper part 37 of the base and the bottom plate 43, the clamping sleeve 49 extending up through these openings. When the clamping sleeve 49 is tightened the rim of the uppermost plate 50 is drawn into tight engagement with the underside of the upper section 37 of the base, as best illustrated in Fig. 2, so that these plates are firmly held within the base and there is no danger of their moving and rattling. These plates 50 are preferably, of course, made of scrap metal or as a by-product of other manufactured articles.

From the foregoing it is apparent that the present invention provides a shaving mirror which is extremely attractive in appearance and is very convenient to use inasmuch as it is carried by a heavy base through a universal connection which permits the mirror to be moved to any desired angle but at the same time holds the mirror at the adjusted angle without further manipulation. It will further be noted that substantially the entire face of the mirror is usable and that the invention provides a shaving mirror which is extremely simple and inexpensive so that it can be produced and sold at low cost and at the same time is of rugged and durable construction.

We claim as our invention:

1. A pedestal mirror, comprising a mirror panel, a base disposed directly under said panel and having a broad flat bottom adapted to rest on a horizontal surface and having an upward extension, clamping means including a jaw member having an integrally formed jaw at one end engaging one side of said extension and an integrally formed jaw at its opposite end engaging one flat face of said panel, a companion jaw member having an integrally formed jaw at one end engaging the opposite side of said extension and an integrally formed jaw at its opposite end engaging the opposite flat face of said panel, and means for drawing said companion jaw members directly toward one another to firmly grip the flat faces of the mirror panel between one pair of said jaws and to grip said extension between the other pair of said jaws.

2. A pedestal mirror, comprising a mirror panel, a base disposed directly under said panel and having a broad flat bottom adapted to rest on a horizontal surface and having an upward extension, clamping means including a jaw member having an integrally formed jaw at one end engaging one side of said extension and an integrally formed jaw at its opposite end engaging one flat face of said panel, a companion jaw member having an integrally formed jaw at one end engaging the opposite side of said extension and an integrally formed jaw at its opposite end engaging the opposite flat face of said panel, and means for drawing said companion jaw members directly toward one another to firmly grip the flat faces of the mirror panel between one pair of said jaws and to grip said extension between the other pair of said jaws, and interlocking means between one of said one pair of jaws and said panel.

3. A pedestal mirror, comprising a mirror panel, a base disposed directly under said panel and having a broad flat bottom adapted to rest on a horizontal surface and having an upward extension, clamping means including a jaw member having an integrally formed jaw at one end engaging one side of said extension and an integrally formed jaw at its opposite end engaging one flat face of said panel, a companion jaw member having an integrally formed jaw at one end engaging the opposite side of said extension and an integrally formed jaw at its opposite end engaging the opposite flat face of said panel, and a screw extending through each of said jaw members at a place between its jaws, said screw drawing said companion jaw members directly toward one another to firmly grip the flat faces of the mirror panel between one pair of said jaws and to grip said extension between the other pair of said jaws.

4. A pedestal mirror, comprising a mirror panel, a base disposed directly under said panel and having a broad flat bottom adapted to rest on a horizontal surface and having an upward extension, clamping means including a jaw member having an integrally formed jaw at one end engaging one side of said extension and an integrally formed jaw at its opposite end engaging one flat face of said panel, a companion jaw member having an integrally formed jaw at one end engaging the opposite side of said extension and an integrally formed jaw at its opposite end engaging the opposite flat face of said panel, and means for drawing said companion jaw members directly toward one another to firmly grip the flat faces of said mirror panel between one pair of said jaws and to grip said extension between the other pair of said jaws, and interlocking means between one of said one pair of jaws and the corresponding flat face of said panel.

5. A pedestal mirror comprising a mirror panel including a mirror plate and a backing plate secured to said mirror plate, a base disposed directly under said panel and having a broad flat bottom adapted to rest on a horizontal surface and having an upward extension, clamping means including a jaw member having an integrally formed jaw at one end engaging one side of said extension and an integrally formed jaw at its opposite end engaging one flat face of said panel, a companion jaw member having an integrally formed jaw at one end engaging the opposite side of said extension and an integrally formed jaw at its opposite end engaging the opposite flat face of said panel, and means for drawing said companion jaw members directly toward one another to firmly grip the flat faces of said mirror panel between one pair of said jaws, and to grip the extension between the other pair of said jaws and interlocking means between said backing plate and that jaw engaging said backing plate.

6. A pedestal mirror comprising a mirror panel including a mirror plate and a backing plate secured to said mirror plate, a base disposed directly under said panel and having a broad flat bottom adapted to rest on a horizontal surface and having an upward extension, clamping means including a jaw member having an integrally formed jaw at one end engaging one side of said extension and an integrally formed jaw at its opposite end engaging one flat face of said panel, a companion jaw member having an integrally formed jaw at one end engaging the opposite side of said extension and an integrally formed jaw at its opposite end engaging the opposite flat face of said panel, and means for drawing said companion jaw members directly toward one another to firmly grip the flat faces of said mirror panel between one pair of said jaws and to grip said extension between the other pair of said jaws, and interlocking means between said backing plate and that jaw engaging said backing plate, said interlocking means comprising a projection provided on one of said last two members and extending perpendicularly to the face of said panel and a recess provided in the other of said last two members and closely fitting said projection.

WILLIAM LA HODNY.
GUST C. HOFF.